United States Patent Office 2,992,885
Patented July 18, 1961

2,992,885
ADDUCTS OF DIBORANE WITH METAL SALTS
Harold L. Jackson, Hockessin, and Henry C. Miller, Wilmington, Del., assignors to E. I. du Pont de Nemours and Company, Wilmington, Del., a corporation of Delaware
No Drawing. Filed Nov. 3, 1958, Ser. No. 771,197
9 Claims. (Cl. 23—14)

This invention relates to a new class of boron compounds. More particularly, it is concerned with adducts of diborane with certain metal salts and to a method for their preparation.

Boron compounds, and particularly boron hydrides, have received a great deal of attention during the past few years as components of high energy fuels. As a result of this activity, boron hydrides are becoming more readily available and new outlets for them are being sought. One such new application involves their use as reducing agents and in this field it is particularly desirable to develop new types of boron compounds having useful reducing properties.

It is an object of this invention to provide new and useful boron compounds. A further object is to provide new diborane derivatives having useful reducing properties and processes for their preparation. Other objects will appear hereafter.

These and other objects are obtained by providing adducts of diborane with metal salts of the formula MX or $MX_2$ in which M is a metal of groups I-A or II of the periodic table having an atomic number of 3-56, inclusive, i.e., sodium, potassium, lithium, rubidium, cesium, beryllium, magnesium, calcium, strontium, barium, cadmium and zinc, and in which the anion X is a member of the group consisting of $CN^-$, $RCOO^-$, $CNO^-$, $R_2NCS_2^-$, $C(CN)_3^-$, and $N(CN)_2^-$, wherein R is a hydrocarbon radical. The periodic table referred to herein is the one appearing in Deming's "General Chemistry," chap. 11, 5th ed., 1944, John Wiley & Sons, Inc.

An especially useful group of the products of this invention are those having the formula

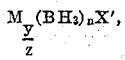

wherein M is a metal of groups I-A or II of the periodic table having an atomic number of 3-56, inclusive, of valence z, X' is the anion $CN^-$ or $RCHO_2^=$ of valence y, R is a hydrocarbon radical and n is a positive integer greater than 1.

The preferred hydrocarbon radicals R in the anions X and X', as defined above, are alkyl or aryl radicals. Especially preferred are the alkyl and aryl radicals having 1 to 12 carbon atoms.

The products of this invention are conveniently prepared by introducing gaseous diborane into a dry reaction vessel containing a dispersion of the metal salt in a methyl ether such as, for example, ethylene glycol dimethyl ether and diethylene glycol dimethyl ether, or in tetrahydrofuran at ordinary temperature (20–30° C.). The diborane is rapidly absorbed at essentially atmospheric or even subatmospheric pressure and an exothermic reaction takes place.

The reaction of diborane with sodium cyanide is the metal salt is illustrated by the following equation:

$$NaCN + B_2H_6 \rightarrow Na(BH_3)_2CN$$

The reaction vessel is externally cooled as necessary to keep the reaction temperature below 30° C. The addition of the diborane is continued until there is no further decrease in pressure in the reaction system, and, in the case of sodium cyanide, until at least one mole of diborane is absorbed for each mole of salt present in the reaction mixture. The metal salt usually dissolves during the course of the reaction and if any such salt remains undissolved at the end it can be removed by filtration.

An excess of diborane can be used if desired and the excess diborane can then be removed by subjecting the reaction mixture to a vacuum until its pressure at room temperature is essentially equal to the vapor pressure of the solvent. The removal of all volatile material in the reaction mixture can be accomplished by heating under reduced pressure. The residue is the dietherate of the diborane/metal salt adduct. Or alternatively, the product can frequently be isolated as a solid dioxanate by adding excess dioxane to the reaction mixture. The solid dioxanate is filtered from this mixture and dried at room temperature under reduced pressure.

The diborane/metal salt adducts of this invention are soluble in water and in alcohol, but are insoluble in nonpolar solvents, e.g., hydrocarbons such as benzene and heptane. The aqueous and alcoholic solutions of the adducts of this invention have strong reducing properties. They readily reduce silver and nickel salts to the free metals.

In some cases reduction of the anion occurs during reaction of the metal salt with diborane. For example, in the reaction of diborane with the metal carboxylates, it is believed that the carboxylate ion is reduced during the reaction to the divalent ion

which then combines with 1 mole of diborane and 2 atoms of group I-A metal or 1 atom of group II metal.

In some cases the metal salt does not dissolve in the reaction mixture during the reaction with diborane. However, in such instances, there is a marked change in the appearance of the salt as the reaction proceeds. The solid reaction product remaining after the addition of diborane in such cases is filtered from the reaction mixture and dried at ordinary temperature under reduced pressure.

The diborane and the metal salts used in the process of this invention can be of the ordinary grades of these materials available commercially. However, it is preferred that the salts be essentially anhydrous because any moisture present in the reaction system will undergo reaction with the diborane to liberate hydrogen and will thus unnecessarily waste diborane.

The invention is illustrated in further detail by the following examples.

*Example 1*

A 100-ml. reaction vessel is charged with 9.8 g. of sodium cyanide (0.2 mole) and evacuated to less than 1 micron pressure at room temperature to remove all traces of moisture. Without breaking the vacuum, the vessel containing the sodium cyanide is cooled in a mixture of acetone and solid carbon dioxide. Then approximately 50 ml. of ethylene glycol dimethyl ether (previously dried by slurrying with lithium aluminum hydride) is allowed to distill onto the sodium cyanide.

Gaseous diborane is then introduced into the reaction vessel over the sodium cyanide slurry at room temperature. The diborane is rapidly absorbed and external cooling is necessary to keep the temperature of the reaction mixture below about 30° C. After each addition of diborane the gas is completely absorbed and the pressure in the reaction vessel rapidly falls to the vapor pressure of the solvent until diborane in excess of 0.2 mole is added. The pressure then becomes greater than the vapor pressure of the solvent to a degree proportionate to the amount of excess diborane introduced. As the diborane is added, the sodium cyanide dissolves in the reaction mixture. After an excess of diborane is added, essentially all of the solid sodium cyanide is in solution.

The reaction mixture is stirred at room temperature until the reaction is complete as shown by there being no further drop in the internal pressure. The reactions generally are complete in a few minutes but stirring at room temperature for 1–2 hours in the presence of excess diborane insures that all the NaCN has entered into reaction with the diborane. The pressure in the reaction vessel is then reduced until a small part of the solvent is evaporated and the pressure over the mixture is essentially the vapor pressure of the solvent in order to remove the unchanged excess diborane. A small amount of insoluble material remaining in the reaction mixture is removed by filtration in an atmosphere of dry nitrogen. The addition of 200–300 ml. of anhydrous dioxane to the filtrate gives a copious precipitate of a white solid which is collected and dried under high vacuum at room temperature. There is obtained 41.53 g. of the dioxanate of the sodium cyanide/diborane adduct.

*Analysis.* — Calc'd for $NaCNB_2H_6 \cdot 2C_4H_8O_2$: C, 42.78%; H, 8.76%; N, 5.54%; Na, 9.1%; B, 8.57%. Hydrogen obtained on acid hydrolysis, 532 cc./g. Found: C, 42.98%; H, 8.82%; N, 5.33%; Na, 9.9%; B, 9.23%. Hydrogen obtained on acid hydrolysis, 572.3 cc./g.

The sodium cyanide/diborane bis-dioxanate is soluble in water, alcohol, acetone, dimethylformamide, acetonitrile, ethyl acetate, methyl benzoate, and pyridine. It is insoluble in ether, benzene, and dioxane. Solutions in water and alcohol slowly evolve hydrogen at room temperature and rapidly reduce silver and nickel ions to free silver and nickel. The solid shows a characteristic X-ray pattern which does not contain lines characteristic of sodium cyanide or of sodium borohydride.

The $B^{11}$ (boron) magnetic resonance spectra of solutions of the crude product in ethylene glycol dimethyl ether show two quadruplets to indicate two types of $BH_3$ groups. One quadruplet is sharp and well defined and is believed to be due to a $BH_3$ group bound to the carbon of the cyanide ion. The other quadruplet is weaker and more diffuse as might be expected for a $BH_3$ group bound to the nitrogen of the cyanide ion. Thus, the product is believed to be an etherate of the sodium salt of the $H_3B\text{—}CN\text{—}BH_3$ anion.

When tetrahydrofuran is substituted for the ethylene glycol dimethyl ether in Example I, a similar reaction takes place. However, no reaction is observed in the absence of any solvent or in the presence of diethyl ether, dioxane or triethylamine.

*Example II*

In a manner similar to that described in Example I, 13.0 g. (0.158 mole) of sodium acetate, which has been dried to a pressure of less than 1 micron, is suspended in approximately 80 ml. of ethylene glycol dimethyl ether and treated with an excess (0.182 mole) of diborane. After the reaction is complete, nearly all of the sodium acetate is in solution. The excess diborane is removed under vacuum at room temperature and the small amount of insoluble material (1.5 g.) remaining in the reaction mixture is removed by filtration. To the clear filtrate there is added about 3 volumes of dry dioxane which gives a copious white precipitate. This precipitate is filtered and dried under high vacuum at room temperature. There is obtained 4 g. of the adduct of sodium acetate and diborane having the formula $$Na_2B_2H_6C_2H_4O_2$$

*Analysis.*—Calc'd for $Na_2B_2H_6C_2H_4O_2$: C, 18.00%; H, 7.54%; Na, 34.4%; B, 16.2%. Hydrogen obtained on hydrolysis, 1105 cc./g. Found: C, 17.66%; H, 7.57%; Na, 29.3%; B, 18.62%. Hydrogen obtained on hydrolysis, 1007.4 cc./g.

This product is believed to have the structure

The product of Example II dissolves in water and in alcohol with vigorous evolution of hydrogen. The solutions rapidly reduce silver, nickel and iron ions to the free metals. When the acetate of Example II is replaced by potassium acetate, lithium tridecanoate, sodium benzoate, and lithium pivalate, and reacted with diborane in the same manner as in that example, adducts of these particular salts with diborane are likewise obtained.

*Example III*

A reaction vessel is charged with 12 g. (0.185 mole) of sodium cyanate (previously recrystallized from water and dried under high vacuum) and ethylene glycol dimethyl ether. Diborane is introduced as in the preceding examples and the sodium cyanate reacts readily with 1 mole of diborane per mole of sodium cyanate. The suspended solid does not dissolve but it changes markedly in character as the reaction proceeds. The final reaction mixture is filtered and the solid that is isolated is dried under reduced pressure at atmospheric temperature yielding 16.2 g. of a white solid. This solid is insoluble in acetone, acetonitrile and pyridine and reacts with water to give a vigorous evolution of hydrogen. The resulting aqueous solution rapidly reduces aqueous silver, nickel and iron ions to the free metals.

When the sodium cyanate of Example III is replaced with lithium cyanate, the reaction with diborane in the presence of ethylene glycol dimethyl ether likewise takes place rapidly. In this particular case, the lithium cyanate goes into solution in the reaction mixture.

*Examples IV–VI*

The procedures of the preceding examples are repeated with the exception that the metal salts of those examples are replaced with sodium diethyl dithiocarbamate, sodium dicyanamide, $NaN(CN)_2$, and potassium tricyanoformate, $KC(CN)_3$, respectively, in equivalent amounts. These salts react similarly with diborane in the presence of etheylene glycol dimethyl ether and products are obtained which in aqueous solution have reducing properties.

*Example VII*

A reaction vessel is charged with 8.5 g. (approximately 0.05 mole) of cadmium cyanide of about 80% purity and subjected to vacuum until the salt is dry. The cadmium cyanide is then covered with 90 ml. of ethylene glycol dimethyl ether which has been distilled off of lithium aluminum hydride. To this slurry there is added 0.18 mole of diborane, of which 0.095 mole is absorbed. Nearly all of the cadmium cyanide dissolves during the reaction at room temperature. The excess diborane is removed by subjecting the reaction mixture to a vacuum and the unchanged solids are removed by filtration.

The filtrate is concentrated to a final weight of 22.5 g. This solution is found by analysis to contain 20.23% cadmium, 2.18% hydrolyzable hydrogen, 8.12% boron, and 5.08, 5.39% nitrogen. Theory for a 39.6%, by weight, solution of $Cd(H_3BCNBH_3)_2$ in ethylene glycol dimethyl ether is 20.25% cadmium, 2.18% hydrolyzable hydrogen, 7.81% boron, and 5.06% nitrogen.

On standing at room temperature, the glycol ether solution of the diborane-cadmium cyanide adduct decomposes slowly with formation of a black precipitate. The glycol ether solution is soluble, without reaction, in absolute alcohol and the resulting alcoholic solution rapidly reduces silver and nickel salts to the free metals. The glycol ether solution rapidly evolves hydrogen on acidification, and is miscible, with reaction, with water and with acetone.

The examples have illustrated the products and process of this invention by reference to the reaction of specific metal salts of certain anions. However, the invention also includes the adducts of diborane with other groups I–A and II metal (of atomic number 3–56) salts of these anions, e.g., the lithium, rubidium, cesium, beryllium, magnesium, calcium, strontium, barium, and zinc salts of the anions listed hereinbefore.

As illustrated by the examples, the diborane/metal salt adducts have reducing properties. Thus, aqueous solutions of these products reduce silver nitrate to metallic silver and nickel chloride to metallic nickel.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Adducts of diborane with metal salts of the formula $$MX_z$$

the adduct containing one mol of diborane for each mol of anion in the adduct, wherein M is a metal selected from the class consisting of metals of group I–A and group II of the periodic table, said metal having an atomic number of 3–56, inclusive, and X is an anion selected from the group consisting of $CN^-$, $RCOO^-$, $CNO^-$, $R_2NCS_2^-$, $C(CN)_3^-$ and $N(CN)_2^-$, R representing a hydrocarbon radical selected from the group consisting of alkyl and aryl radicals having 1 to 12 carbon atoms, and $z$ is the valence of the metal.

2. Compounds represented by the formula $$M[(BH_3)_2CN]_z$$

wherein M is a metal selected from the class consisting of metals of group I–A and group II the periodic table, said metal having an atomic number of 3–56, inclusive, and $z$ is the valence of the metal.

3. Sodium cyanide/diborane adduct having the formula $$Na(BH_3)_2CN$$

4. The bis-dioxanate of the adduct having the formula $Na(BH_3)_2CN$.

5. Sodium acetate/diborane adduct having the formula $$Na_2B_2H_6C_2H_4O_2$$

6. Process which comprises reacting diborane with a metal salt of the formula $$MX_z$$

wherein M is a metal selected from the class consisting of metals of group I–A and group II of the periodic table, said metal having an atomic number of 3–56, inclusive, and X is an anion selected from the group consisting of $CN^-$, $RCOO^-$, $CNO^-$, $R_2NCS_2^-$, $C(CN)_3^-$ and $N(CN)_2^-$, R representing a hydrocarbon radical selected from the group consisting of alkyl and aryl radicals having 1 to 12 carbon atoms, and $z$ is the valence of the metal, in a reaction medium selected from the class consisting of methyl ethers and tetrahydrofuran.

7. The process of claim 6 wherein the reaction temperature is maintained below about 30° C.

8. The process of claim 6 wherein the metal salt is in substantially anhydrous form.

9. Compounds represented by the formula $$M_{2/z}(BH_3)_2O_2CHR$$

wherein M is a metal selected from the class consisting of metals of group I–A and group II of the periodic table, said metal having an atomic number of 3–56, inclusive, $z$ is the valence of the metal and R is a hydrocarbon radical selected from the group consisting of alkyl and aryl radicals having 1 to 12 carbon atoms.

References Cited in the file of this patent

Wittig et al.: Chem. Abstracts, vol. 46, page 6025 (1952).